United States Patent [19]

Björklund

[11] Patent Number: 5,592,369
[45] Date of Patent: Jan. 7, 1997

[54] DEVICE IN A D.C. CIRCUIT FOR TRANSFER OF A CURRENT FROM ONE CURRENT PATH TO ANOTHER AND FOR CONTROL OF THE VOLTAGE IN THE CIRCUIT

[75] Inventor: Per-Erik Björklund, Bjursås, Sweden

[73] Assignee: Asea Brown Boveri AB, Västerås, Sweden

[21] Appl. No.: 303,758

[22] Filed: Sep. 9, 1994

[30] Foreign Application Priority Data

Sep. 10, 1993 [SE] Sweden .................................. 9303073

[51] Int. Cl.$^6$ .................................................. H03K 17/72
[52] U.S. Cl. ............................... 363/51; 363/50; 363/37; 363/35
[58] Field of Search .................................. 361/56–57, 18, 361/54–55, 58, 91, 111, 118, 119; 307/105; 379/33, 412; 363/95, 96, 50, 97, 98, 41, 132, 137, 37, 35, 51; 323/208–216, 265–281, 282, 292, 304, 317

[56] References Cited

U.S. PATENT DOCUMENTS

4,360,743  11/1982  Stokes .................. 307/252 B
4,805,083  2/1989  Konopka .................. 363/143

Primary Examiner—Stuart N. Hecker
Assistant Examiner—Aditya Krishnan
Attorney, Agent, or Firm—Watson Cole Stevens Davis, PLLC

[57] ABSTRACT

A device in a system for power transmission by means of high voltage direct current wherein: a first current path and a second current path are interconnected at a branch point; a first semiconductor connection is connected into the first current path only and which is controllable between conducting and non-conducting states and vice versa; a second semiconductor connection having a diode function and which is connected into the second current path only; a capacitor branch comprising a capacitor and connected between a first connection point on the first current path and a second connection point on the second current path; the first connection point and the branch point are located on opposite sides of the first semiconductor connection; the second connection point and the branch point are located on opposite sides of the second semiconductor connection; and control members for controlling, in dependence on the voltage across the capacitor, the first semiconductor connection between a non-conducting and a conducting state.

24 Claims, 11 Drawing Sheets

DEVICE IN A D.C. CIRCUIT FOR TRANSFER OF A CURRENT FROM ONE CURRENT PATH TO ANOTHER AND FOR CONTROL OF THE VOLTAGE IN THE CIRCUIT

TECHNICAL FIELD

The present invention relates to a device in a direct current circuit with a first current path and a second current path, which are interconnected at a branch point.

The invention relates especially to devices in circuits for high direct currents and/or high direct voltages, such as plants for power transmission by means of high-voltage direct current (HVDC plants/HVDC transmissions).

BACKGROUND ART

In a plant for power transmission by means of high-voltage direct current, switchings of the direct current in a converter station between different current paths are made in certain operating cases.

In a monopolar HVDC transmission, or during monopolar operation of a bipolar transmission, the operating current of a converter station flows in undisturbed operation via a ground electrode. Normally, this ground electrode is located at a distance from the station and is connected thereto through an electrode line, often of considerable length. An HVDC station normally has a neutral busbar, by which is meant in this application a busbar in an HVDC station which is intended, during normal operation, to lie at a potential near ground. Such a busbar is connected to or connectible to the ground electrode via the electrode line. Neutral busbars normally exist in the converter stations both in monopolar and in bipolar HVDC transmissions.

In connection with certain faults, for example an interruption in the electrode line, it is known to temporarily connect the neutral busbar to a station ground with the aid of a mechanical circuit breaker, the station ground being a ground electrode arranged in the station or near the station. After termination of the disturbance, the circuit breaker has been opened, whereby the operating d.c. current has been transferred from the station ground back to the electrode line and the ordinary ground electrode. This has caused high overvoltages to arise on the neutral busbar because of the impedance of the electrode line, which has necessitated overvoltage protective devices in the form of surge arresters, which have had to be amply dimensioned both from the point of view of voltage and energy. The overvoltage protective devices have therefore become costly. Further, the mechanical circuit breakers have constituted an undesirable complication of an HVDC station.

Because of the impedance of the electrode line, overvoltages on the neutral busbar in an HVDC station can also occur at an overcurrent on the electrode line. Also such overvoltages necessitate amply dimensioned surge arresters in known HVDC stations.

Similar problems arise if, in case of a fault in one of the poles of a bipolar transmission, it is desired to transfer the direct current from this pole to the electrode line and the ground electrode to be able to continue the operation of the plant as monopolar operation with the faultless pole. The case will be the same if it is desired to transfer the direct current back from the electrode line to a so-called metallic return, that is, to the line of the faulty pole, for a more permanent monopolar operation. Similar problems also arise if, in a bipolar transmission, during monopolar operation with a metallic return, it is desired to transfer the operating current to the electrode line, for example as a first step in a change to a bipolar operation.

The problems have been described above with particular reference to a plant for power transmission by means of high-voltage direct current, but similar problems arise generally in d.c. circuits when transferring a direct current from one current path to another, whereby in a known manner the circuit impedances, and in particular the circuit inductances, render the transfer difficult and cause overvoltages.

SUMMARY OF THE INVENTION

The present invention aims to provide a device of the kind described in the introductory part of the description, which comprises a device by means of which a transfer of a direct current can be made between different current paths in a d.c. circuit. The invention particularly aims to provide a device which is suited for use at high voltages and/or currents, and in particular in a converter station for power transmission by means of high-voltage direct current.

Further, the invention aims to provide a device of the kind described in the introductory part of the description, in which, in a simple and efficient manner, a limitation of the overvoltage level in the circuit can be achieved, and which therefore allows the necessary overvoltage protective devices to become considerably simplified and less expensive.

Further, the invention aims to provide a simple device of the stated kind, in which the transfer of the direct current can be made completely without mechanical breakers.

What characterizes a device according to the invention will become clear from the appended claims.

BRIEF DESCRIPTION OF THE DRAWINGS

In the following the invention will be described in greater detail with reference to the accompanying FIGS. 1–9, wherein FIGS. 2–6 illustrate different modes of operation of the station shown in FIG. 1.

DESCRIPTION OF THE PREFERRED EMBODIMENTS

Figure 1:
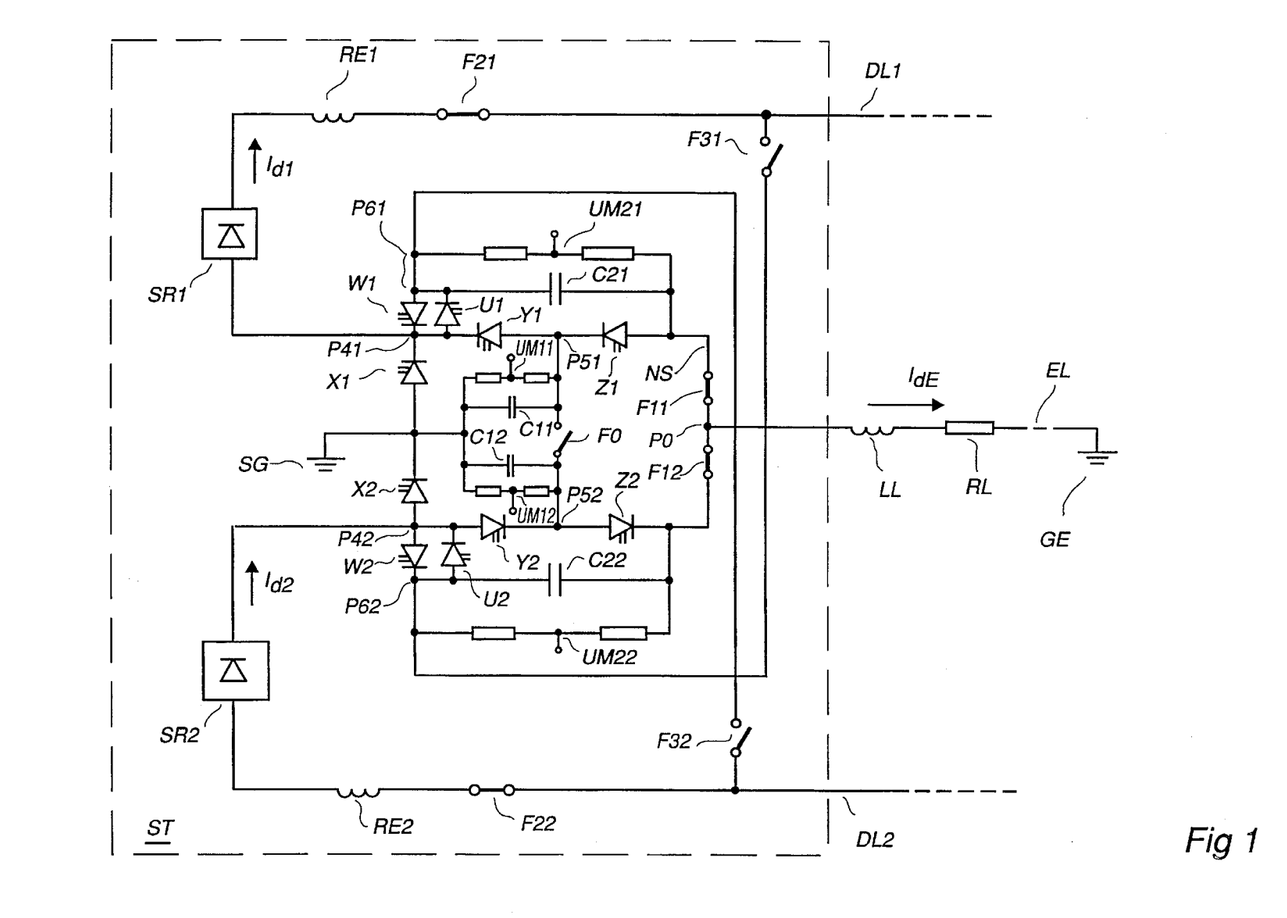
FIG. 1 shows an example of a converter station in a bipolar HVDC transmission, which station is arranged according to the invention.

FIG. 1 shows a station ST in a plant for power transmission by means of high-voltage direct current—an HVDC plant. The station is a bipolar station, that is, it has two series—connected converters SR1 and SR2, each one being connected to a d.c. line DL1 and DL2, respectively, via a smoothing reactor, RE1 and RE2, respectively. The point of connection PO between the two poles is connected to an electrode line EL, which leads to a ground electrode GE, arranged at a distance from the station ST. The inductance and resistance, respectively, of the electrode line are symbolically shown in the figure as the discrete impedances LL and RL, respectively. The direct current in the electrode line is designated $I_{dE}$. The point of connection PO is located at the neutral busbar NS of the station, which busbar extends between the two converters SR1 and SR2.

In case of drop out of one of the two poles of the plant, the plant can be operated in monopolar operation, in which case the direct current of the transmission is conducted in one direction by the d.c. line of the faultless pole and in the other direction, either via ground by means of the electrode line EL and the ground electrode GE, or—after switching— via the d.c. line of the faulty pole (so-called metallic return). The station has two disconnecting switches, F21 and F22, by means of which each pole line can be disconnected from the converter of the same pole, for example for using the pole line as metallic return.

The station is provided with a ground connection, the so-called station ground SG, arranged in or near the station. Under certain conditions, for example at overvoltages, or in case of a fault on the electrode line, the neutral busbar NS can be temporarily grounded in the station. The busbar is then connected to the station ground SG by means of a switching member, for example a mechanical electric switching device, or alternatively, as will be described below, an electronic switching member in the form of a thyristor connection.

As shown in FIG. 1, the station has a number of turn-off thyristor connections, X1, X2, W1, W2, U1, U2, Y1, Y2, Z1, Z2, which are capable of being turned off by means of a control signal. In dependence on the current and voltage conditions, each thyristor connection may consist of one single gate turn-off thyristor or a series connection, parallel connection or series-parallel connection of gate turn-off thyristors. Alternatively, a turn-off thyristor connection may consist of one or more conventional thyristors (not thyristors capable of being turned off via a control signal), which are provided with external turn-off circuits, or of other semiconductor devices which are controllable between conducting and non-conducting states. Certain of the thyristor connections may during a certain interval be supplied with a continuous firing pulse such that they are maintained in conducting state during the interval and have the same function as diodes. Certain of the thyristor connections can be controlled on and off in dependence on a sensed voltage, and in particular the voltage across one of the capacitors of the device, which will be described in more detail below.

Further, the device comprises two normally closed disconnecting switches F11 and F12, arranged in the neutral busbar, as well as a normally open disconnecting switch F0, by means of which the connection points P51 and P52, respectively, between the thyristor connections Y1 and Z1 and the thyristor connections Y2 and Z2, respectively, can be connected. Further, disconnecting switches F31 and F32 are provided for use during monopolar operation with metallic return.

The device also comprises the capacitors C11 and C12, arranged between the neutral busbar NS and the station ground SG, as well as the capacitors C21 and C22, each one connected in parallel with two thyristor connections (e.g. Y1, Z1) arranged in the neutral busbar.

Each capacitor is provided with a voltage measuring member for measuring the capacitor voltage, that is, for generating a measurement signal corresponding to the capacitor voltage. The measuring members are shown in the figure as voltage dividers UM11, UM12, UM21, UM22.

The capacitors may be of any conventional kind which is used for harmonic filtering and overvoltage damping in HVDC plants, possibly oversized taking into consideration their function according to the invention.

During undisturbed bipolar operation, the disconnecting switches F11, F12, F21 and F22 are closed and the other switches open. The direct currents $I_{d1}$ and $I_{d2}$ of the two poles are equally great, and the current in the electrode line EL is therefore zero. The thyristor connections Y1, Z1, Y2 and Z2 are kept continously conducting. The direct current therefore flows along the current path DL2, F22, RE2, SR2, Y2, Z2, F12, F11, Z1, Y1, SR1, RE1, F21, DL1.

Figure 2:
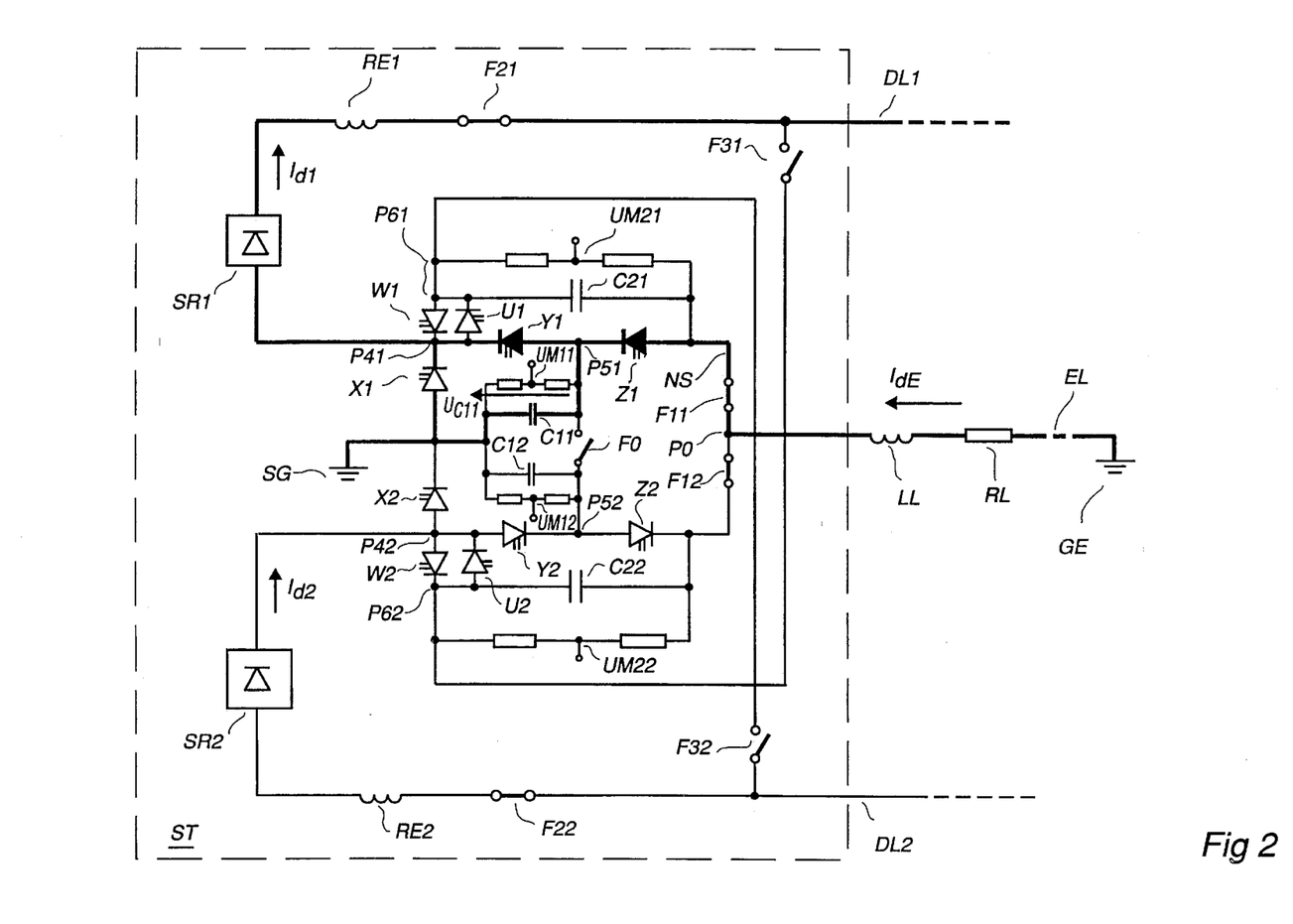
FIG. 2 shows the function during transfer of the current from the station ground to the electrode line and also the function for limiting the voltage of the neutral busbar.

As mentioned in the introductory part of the description, it is known, in certain fault cases, for example an interruption in the electrode line, to temporarily connect the neutral busbar to the station ground. After termination of the disturbance, the operating direct current has been transferred from the station ground back to the electrode line and the ordinary ground electrode. FIG. 2 shows this function, that is, the transfer of the operating direct current of the upper pole in the figure from station ground to the electrode line, and also the function for limiting the voltage of the neutral busbar, for example at an overcurrent in the electrode line. In the figure (and in FIG. 3–5), the current paths used during the function are indicated in thick lines. Of the turn-off thyristor connections included in these current paths, those which are kept continuously conducting, that is, which have a diode function, are indicated by filled symbols. The figure only shows the current paths in the upper pole, since the lower pole in the case shown in FIG. 2 may be assumed to be put out of operation.

A fault, for example in the electrode line during monopolar operation, is assumed to have caused the neutral busbar NS to be connected to station ground by firing of the thyristor connection X1. The current $I_{d1}$ thus initially flows from the station ground SG through the thyristor connection X1 and further through the converter SR1 to the pole line DL1. After correcting the fault, it is desired to resume operation with the electrode line, and the operating current $I_{d1}$ is therefore to be transferred from the current path SG, X1 to the current path GE, EL, F11, Z1, Y1. The thyristor connections Y1 and Z1 are assumed during the process described below to be kept continuously conducting and function as diodes. To start the transfer of the current, X1 is turned off. The current then flows in the path SG, C11, Y1 and charges the capacitor with the polarity shown in the figure. The measuring device UM11 continuously delivers a measurement signal to a control device (not shown in the figure) for the thyristor connection X1, which measurement signal is a measure of the capacitor voltage $u_{C11}$. The control device may be designed in the manner shown in FIG. 9 and delivers a firing signal to X1 when the capacitor voltage reaches an upper limit value. The thyristor connection X1 now takes over the operating current, and the capacitor is discharged. When the capacitor voltage has dropped to a lower limit value, X1 is again turned off, and the procedure continues automatically with X1 operating in pulsed operation. The thyristor connection Y1 operating as a diode prevents the capacitor from being discharged through the thyristor connection X1 upon firing of the latter. During this whole procedure, the voltage of the neutral busbar is negative relative to ground. The negative voltage causes a continuously growing current through the electrode line with the direction indicated in the figure, and a corresponding decay of the current from the station ground. The rate of growth of the electrode line current then primarily depends on the inductance of the electrode line and on the mean value of the voltage of the neutral busbar, that is, on the two voltage limit values mentioned. As the current of the electrode line grows, an increasingly shorter time is needed for discharging the capacitor from the upper to the lower voltage limit value, that is, the conduction intervals for the thyristor connection X1 become shorter and shorter, until the electrode line current has reached the value $I_{d1}$. The transfer of the direct current to the electrode line is then completed, and X1 ceases to fire. The direct current $I_{d1}$ now flows along the current path GE, EL, F11, Z1, Y1, SR1, and so on.

The function described with reference to FIG. 2 is substantially the same at an overvoltage on the neutral busbar NS caused by the converter. At an overvoltage with a negative polarity relative to ground (caused by SR1), and of such a magnitude that it reaches the above-mentioned upper voltage limit value, the thyristor connection X1 is automatically fired, whereby the overvoltage is limited, and the thyristor is automatically turned off if the overvoltage drops to the above-mentioned lower limit value. A positive overvoltage is taken care of in a corresponding manner by the corresponding member of the device in the lower half of the figure (the thyristor connection X2, the capacitor C12, the measuring member UM12). Overvoltages caused by external events such as, for example, lightning, can be limited in a simple manner by a conventional surge arrester of, for example, zinc oxide.

Figure 3:
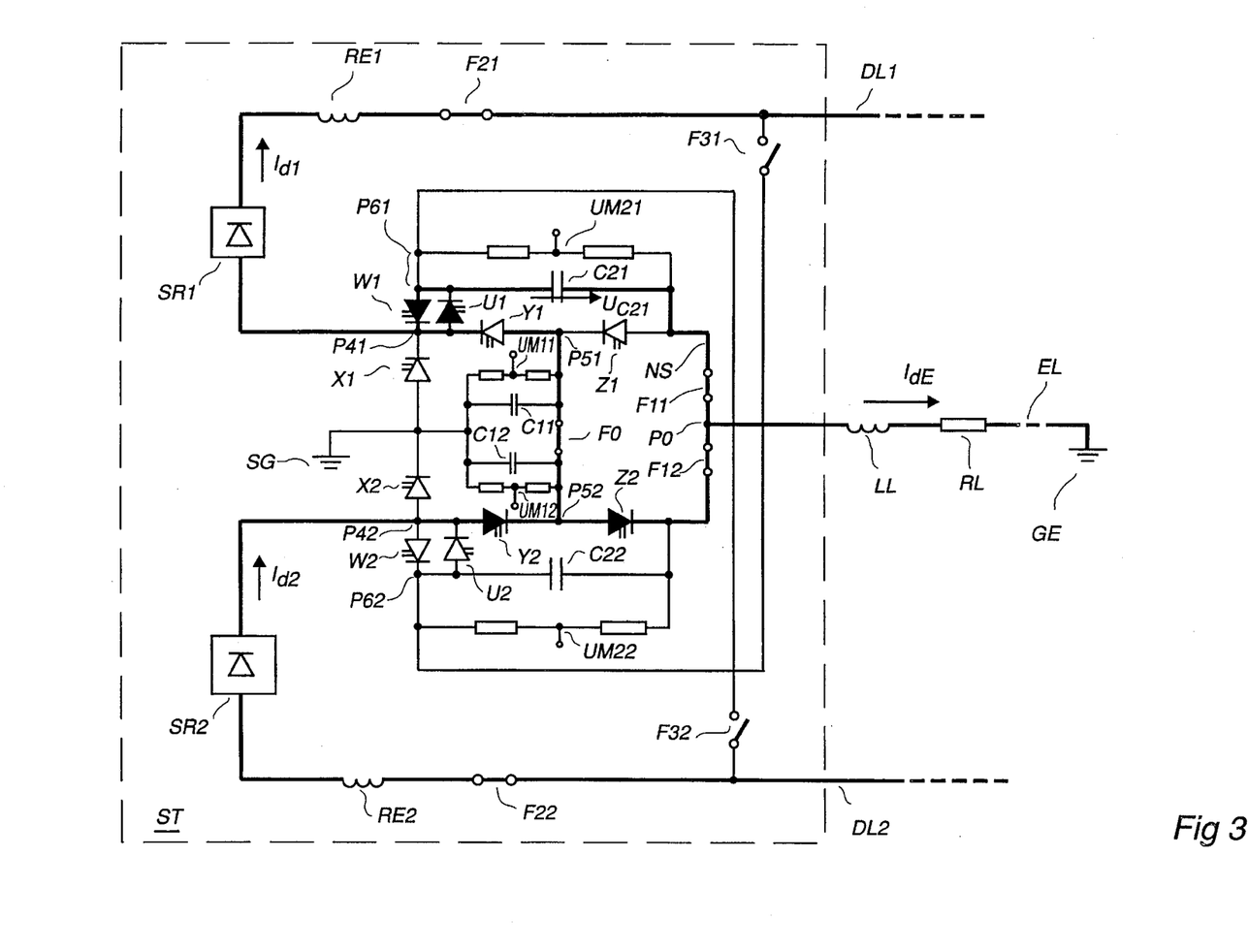
FIG. 3 shows the function during transfer of the direct current from a faulty pole to the electrode line.

FIG. 3 shows the function of the device when it is used for transferring the direct current from a faulty pole to the electrode line. A fault is assumed to have occurred in the upper pole in the figure, and it is desired that the operating direct current of the pole be transferred to the electrode line for maintaining the operation as a monopolar transmission. During the transfer of the current, the thyristor connections U1, W1, y2, and Z2 are kept continuously turned on, and they will therefore operate as diodes. The normally continuously conducting Z1 is kept turned off. The disconnecting switch F0 is closed, and since Y1 is assumed to be turned on, the operating current now flows along the path SR2, Y2, F0, Y1, SR1, etc. The thyristor connection Y1 is now turned off. The direct current of the lower pole then flows along the path Y2, Z2, F12, F11, C21, W1, SR1, etc. The capacitor C21 is then charged by the current and with the polarity of the capacitor voltage $u_{C21}$ as shown in the figure. This voltage is measured continuously by the measuring device UM21. When the capacitor voltage has reached an upper limit value, Y1 is fired, whereby the current will again flow along the path Y2, F0, Y1, SR1. During this process, the capacitor is discharged through the current path U1, C21, EL. When the capacitor voltage has dropped to a lower limit value, Y1 is again turned off. In a manner analogous to that described with reference to FIG. 2, the capacitor will be maintained at a voltage, the mean value of which lies between the two limit values mentioned. This voltage causes a successively increasing current in the electrode line and a successively decreasing current through the upper pole. This process continuous until the direct current of the upper pole has, in principle, dropped to zero and the whole direct current of the lower pole flows through the electrode line.

Figure 4:
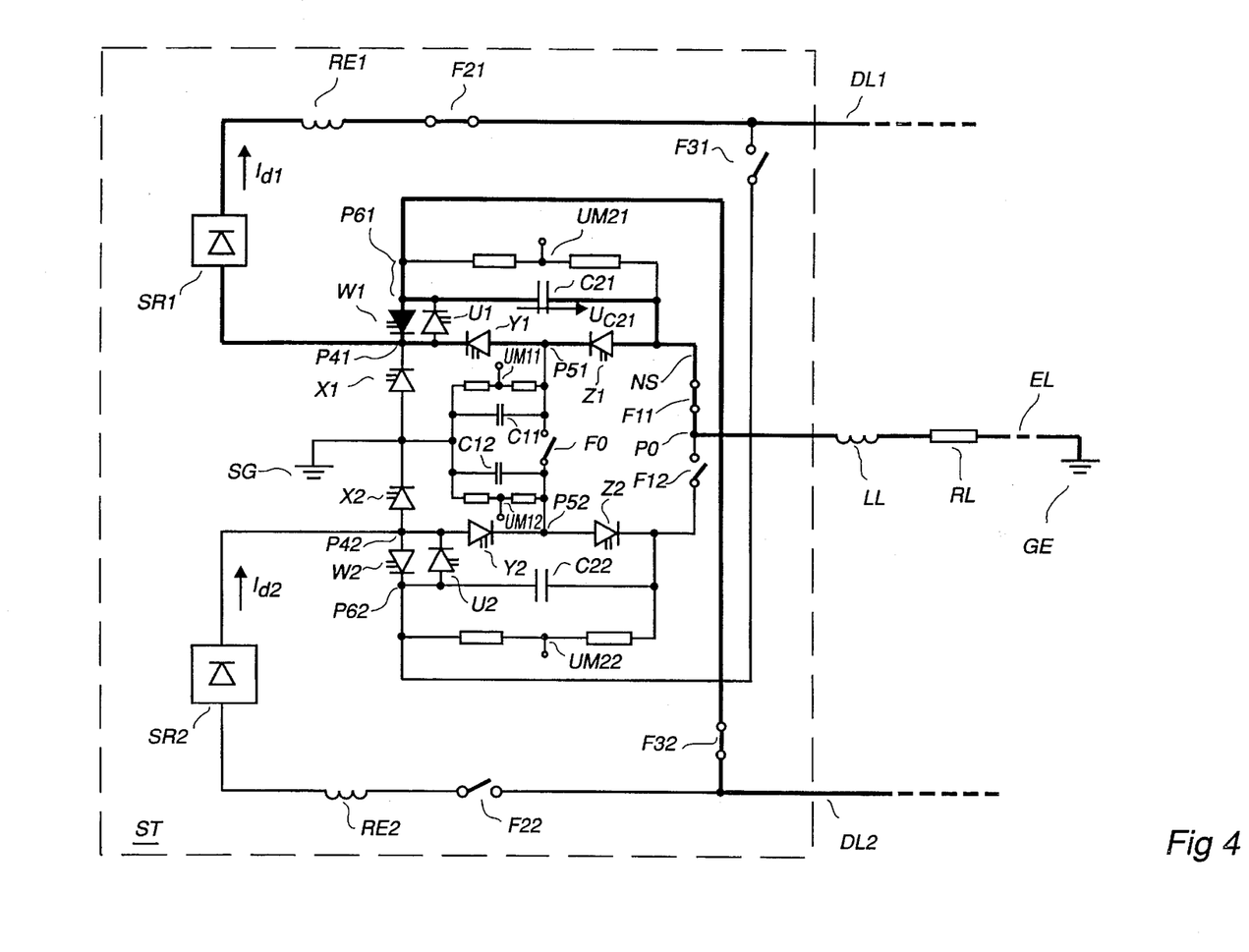
FIG. 4 shows the function during transfer of the direct current from the electrode line to the line of the faulty pole for changing to monopolar operation with so-called metallic return.

FIG. 4 shows the function while assuming that the lower pole has been taken out of operation because of a fault, and that its current has been transferred to the electrode line. The plant operates in monopolar operation. To avoid continuous ground currents during a more permanent monopolar operation, it is desired to transfer the operating current from the electrode line EL to the line DL2 of the faulty lower pole for operation with so-called metallic return. The direct current $I_{d1}$ of the upper pole initially flows, after disconnection of the converter of the lower pole, from the ground electrode GL through the electrode line EL and the continuously turned-on thyristor connections Z1 and Y1. The transfer of the current is started by closing the disconnecting switch F32 and maintaining the thyristor connection W1 continuously turned on. The transfer is initiated by turning off Y1 (and/or Z1). The direct current is taken over by the current path through C21 and W1, and the capacitor is charged with the shown polarity of the capacitor voltage $u_{C21}$. Y1/Z1 is turned on and thereafter turned off in dependence on the capacitor voltage in the same way as described previously. The capacitor voltage causes a successively decreasing current through the electrode line and a successively increasing current through the pole line DL2, and the transfer is automatically terminated when the whole operating current has been taken over by the pole line.

Figure 5:
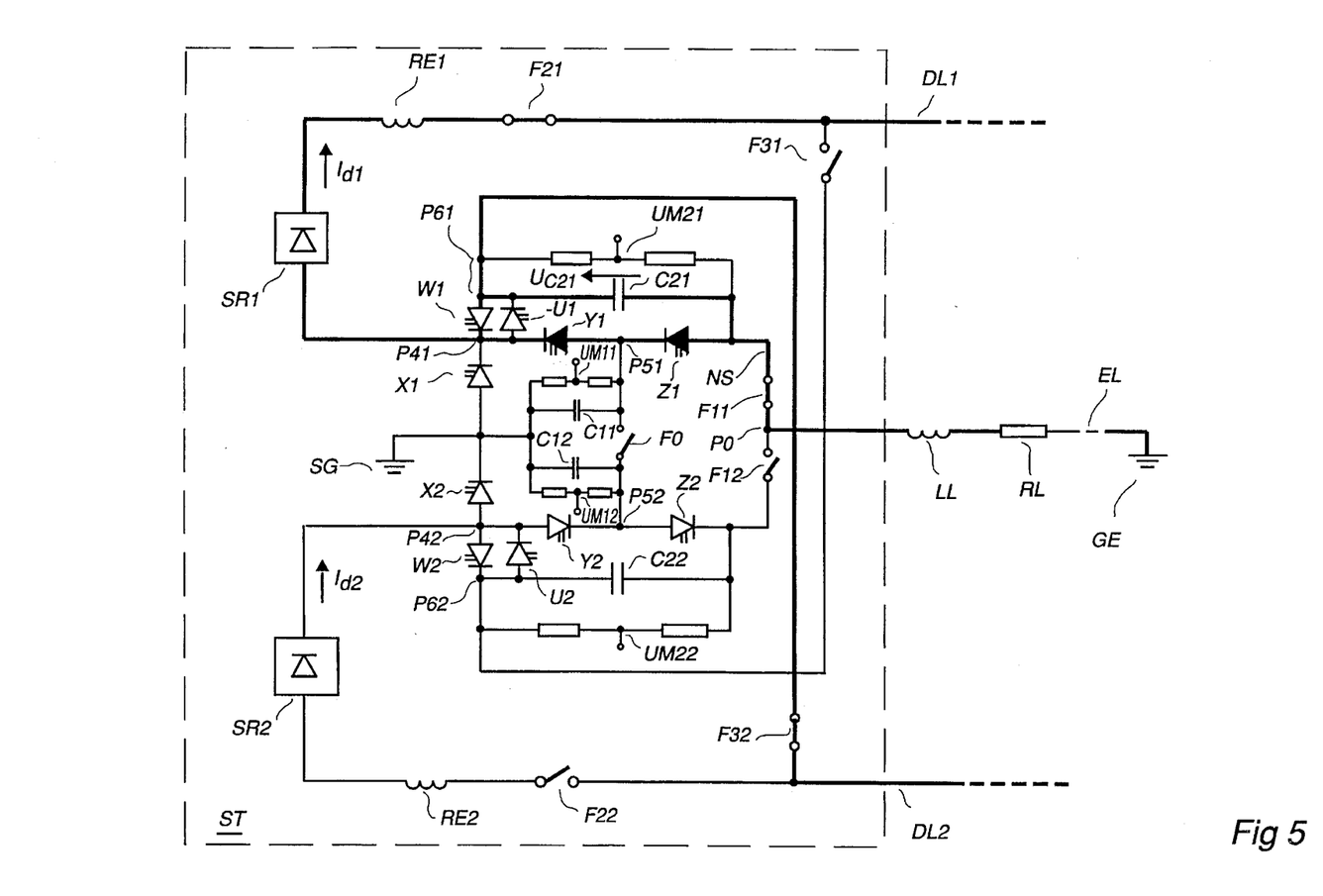
FIG. 5 shows the function in the event that, during monopolar operation with metallic return, it is desired to transfer the operation current to the electrode line, for example as a first step during a change to bipolar operation, FIG. 6 schematically shows a general device according to the invention.

FIG. 5 shows the function in the case where during monopolar operation with the upper pole in the figure in operation and with metallic return through the pole line of the lower pole, it is desired to transmit the operating current to the electrode line, for example as a first step in a change to bipolar operation after removal of a fault in the converter of the lower pole. The current initially flows along the path DL2, F32, W1, SR1, etc. During the transfer, Y1 and Z1 are maintained continuously turned on. The transfer of the current is initiated by turning off W1, whereby the current is taken over by the current path C21, Z1, Y1. This results in a discharge of the capacitor C21 with the polarity of the capacitor voltage $u_{C21}$ shown in the figure. W1 is turned on and off in a manner analogous to that described above, and the capacitor voltage thereby all the time has the polarity shown. This voltage causes a successively increasing current through the electrode line EL and a successively decreasing current through the pole line DL2. After completed transfer of the current, the disconnecting switch F32 can be opened.

The device described above is a special case of a more general device according to the invention. This will be described below with reference to FIG. 6–8.

Figure 6:
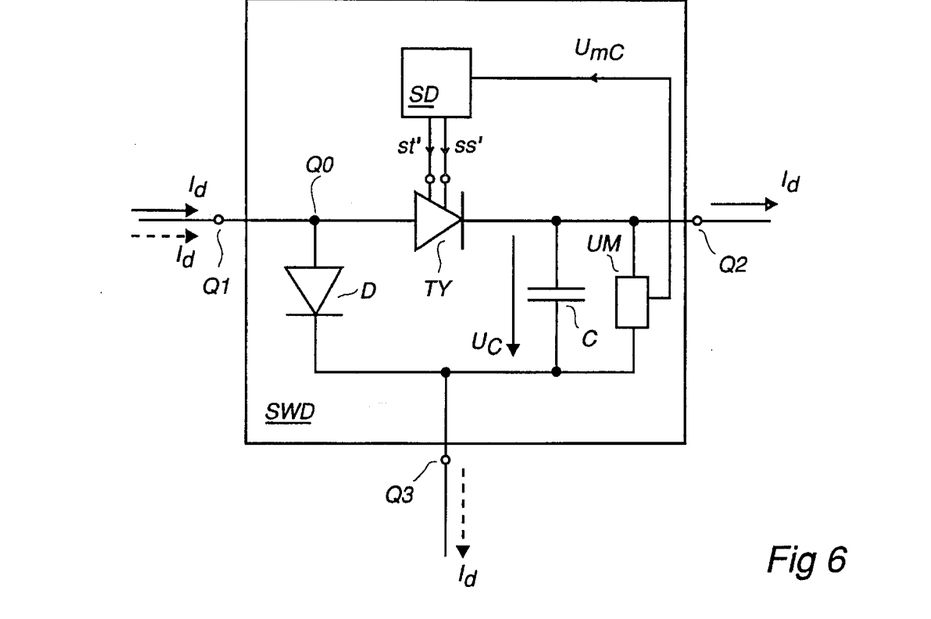

FIG. 6 shows the principle of a device SWD according to the invention. It has three terminals Q1, Q2 and Q3. A direct current flows through the device between two of these terminals. The device is intended for simple transfer of the current from one of these terminals to the third connection. D.c. circuits often display large inductances, and a transfer in a simple manner is therefore normally not possible without unacceptably high overvoltages arising. In the example shown in FIG. 6, a direct current $I_d$ is assumed to flow in through the terminal Q1 and out through the connection Q2. The device according to the invention is intended to make possible a transfer of the current from the terminal Q2 to the terminal Q3.

The device has a gate turn-off thyristor or turn-off thyristor connection TY connected between the terminals Q1 and Q2 and with its connecting direction coinciding with the current $I_d$ flowing through the connection Q1. The current before the transfer is indicated by unbroken arrows and after the transfer by dashed arrows. Further, the device has a diode D connected between the terminals Q1 and Q3 and with its conducting direction coinciding with the current direction after the transfer. Further, a capacitor C is connected between the two terminals Q2 and Q3, between which the current is to be moved. The thyristor TY has a control device SD, which can turn the thyristor on and off in dependence on the voltage $u_c$ across the capacitor. The voltage is sensed by a measuring device UM which delivers a measurement signal $u_{mc}$, corresponding to the voltage, to the control device.

Initially, the thyristor TY is continuously conducting and operates as a diode, for example by the control device delivering a continuous firing signal to the thyristor. The current $I_d$ flows in through terminal Q1, through TY and out through terminal Q2 (unbroken arrows). For transfer of the current from terminal Q2 to terminal Q3, the control device is switched to control of the thyristor in dependence on the capacitor voltage. The control device is thereby adapted to turn on the thyristor when the voltage $u_c$ reaches or exceeds a predetermined upper limit value and to turn off the thyristor when the voltage has dropped to or is lower than a predetermined lower limit value. Initially, it is assumed that the capacitor is discharged, its voltage is zero and the control device therefore turns the thyristor off. The current $I_d$ then flows through the diode D and the capacitor and charges the latter with the polarity indicated in the figure. The capacitor voltage successively reaches the upper limit value, whereby the control device turns on the thyristor which takes over the current. During this process, the diode D prevents the capacitor from being discharged through the thyristor. The capacitor voltage strives to provide an increasing current out through the terminal Q3 and at the same time a decreasing current out through the terminal Q2. In this way, the capacitor is discharged, that is, its voltage drops, and when it has reached the lower limit value, the thyristor is again turned off and the capacitor is charged. In this way, by repeated firings and extinctions of the thyristor, the capacitor voltage will be maintained between the two limit values mentioned. The current out through terminal Q2 decreases, and the current out through terminal Q3 increases, at a rate determined by the capacitor voltage and by the circuit inductances. Finally, the current through terminal Q2 and hence the charging current of the capacitor drop to such an extent that the thyristor is no longer fired, and the transfer of the current from terminal Q2 to terminal Q3 is then completed.

The device is intended for transfer of a current with the polarity shown in FIG. 6. For the opposite polarity, the conducting directions of the thyristor and the diode shall be the opposite.

The choice of the upper limit value for the capacitor voltage must be made taking into consideration the voltage withstand capability of the circuit and the components as well as the desired rate of transfer. The choice of the lower limit value must be made taking into consideration, inter alia, the desired pulse frequency of the thyristor, and also the desired rate of transfer.

Figure 7A:
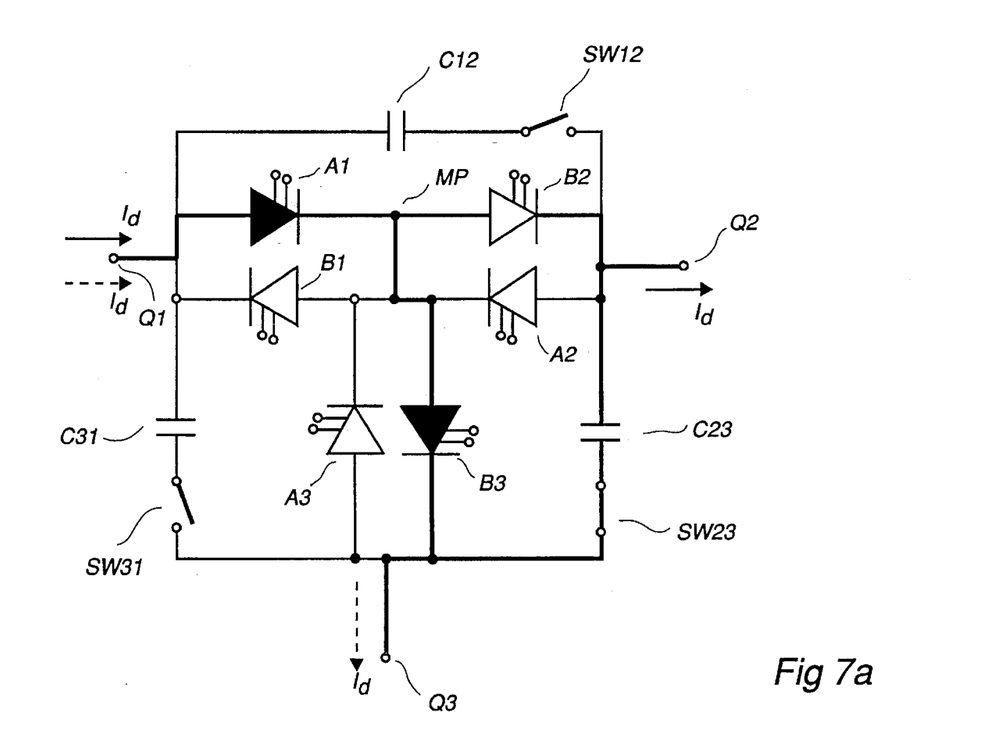
FIG. 7a and FIG. 7b show two examples of general devices according to the invention, which are adapted for transfer of a direct current with an arbitrary direction from an arbitrary terminal to one of the other two terminals of a device.

FIG. 7a shows a device according to the invention, which is designed so as to make possible transfer of current with an arbitary polarity from any one to any one of the three terminals Q1–Q3 of the device. The device has a mid-point MP. To each connection there are connected a first gate turn-off thyristor with the conducting direction towards the mid-point —the thyristors A1, A2, A3—and a second thyristor with the conducting direction out from the mid-point—the thyristors B1, B2, B3. Between each pair of terminals there is connected a capacitor—C12, C23, C31— and in series with each capacitor there is connected a switching member—SW12, SW23, SW31. The switching members may consist of mechanical electric switching devices, such as disconnecting switches, or of bidirectionally conducting semiconductor members.

The function of the device according to FIG. 7a completely follows the principle described with reference to FIG. 6. The thyristor which is connected to that terminal which is not to be concerned by the transfer, and which has a conducting direction corresponding to the current in that terminal, is continuously supplied with a control pulse and operates as a diode. The thyristor which is connected to that terminal which is to carry current after the transfer, and which has a polarity corresponding to the conducting direction of that current, is also maintained continuously conducting and has a diode function. That capacitor which lies between those two terminals between which the current is to be transferred, is switched in by closing the electric switching device thereof. The electric switching devices of the other two capacitors are to be open. The thyristor which is connected to that connection which is not to carry current after the transfer, and which has a conducting direction corresponding to that of the current prior to the transfer, is turned on and off in dependence on the voltage of the switched-in capacitor in the manner described with reference to FIG. 6.

Given the assumption made in connection with FIG. 6, this means that the thyristors A1 and B3 in FIG. 7a are controlled as diodes, that the capacitor C23 is connected by closing the electric switching device SW23, that the electric switching devices SW31 and SW12 are open, that the thyristor B2 is controlled in dependence on the voltage across the capacitor C23, and that the thyristors B1, A2, A3 are continuously turned off. The current paths used for this operating case are shown in thick lines in the same way as in FIGS. 1–5, and the currents prior to the transfer are shown in unbroken arrows and the currents after the transfer in dashed arrows. The corresponding function can be obtained in an analogous manner for an arbitrary combination of connections and for an arbitrary polarity of the current.

Figure 7B:
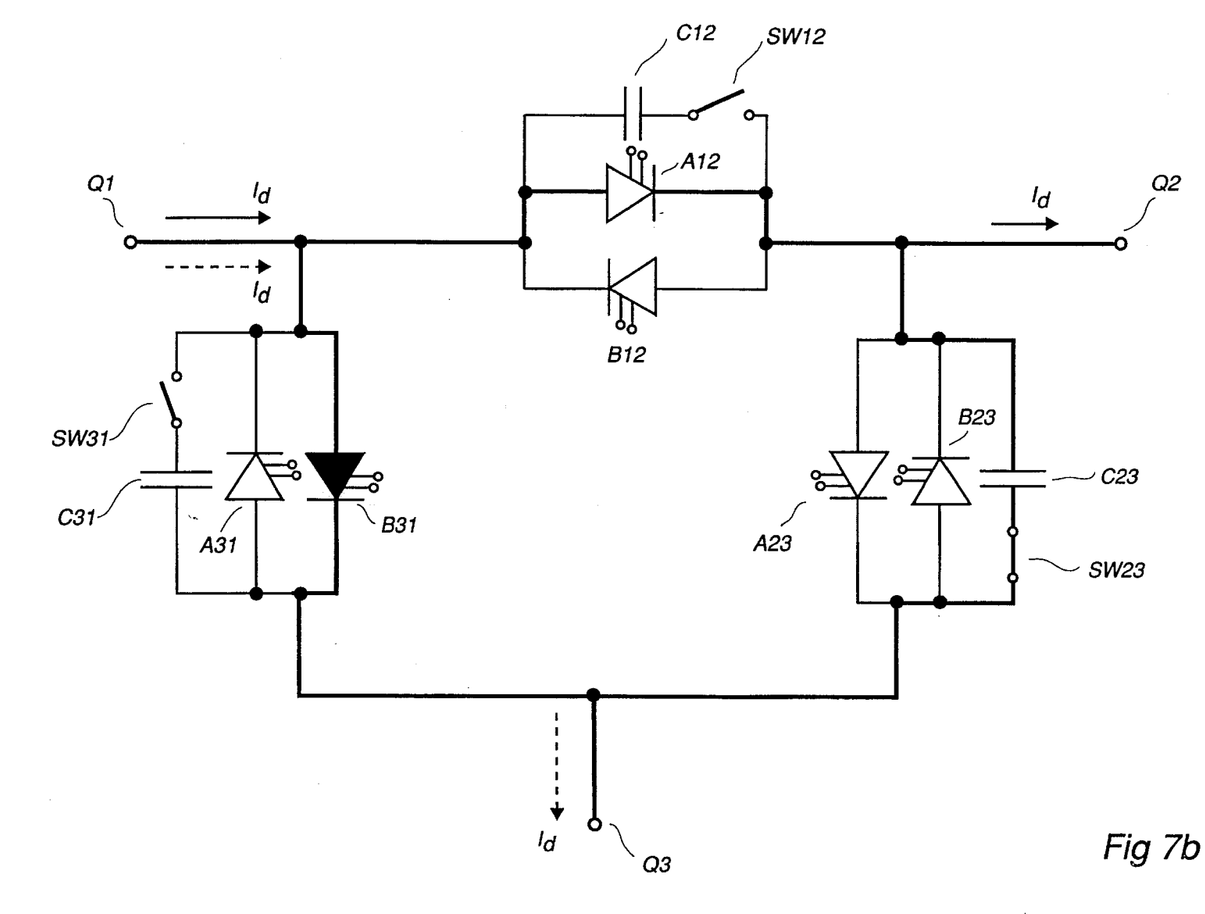

The device shown in FIG. 7a has a "star connection" of three thyristor branches connected to its three terminals Q1–Q3, each branch comprising two antiparallel-connected gate turn-off thyristors (or series connections of such thyristors). Alternatively, the three thyristor branches may be "delta-connected", whereby a branch with two antiparallel-connected thyristors is connected between each pair of the terminals of the device. Such a device according to the invention is shown in FIG. 7b. It has the same components as the device according to FIG. 7a, and the designations are analogous to those in FIG. 7a. The device in FIG. 7b is shown for the same assumed operating case as in FIGS. 6 and 7a.

Figure 8:
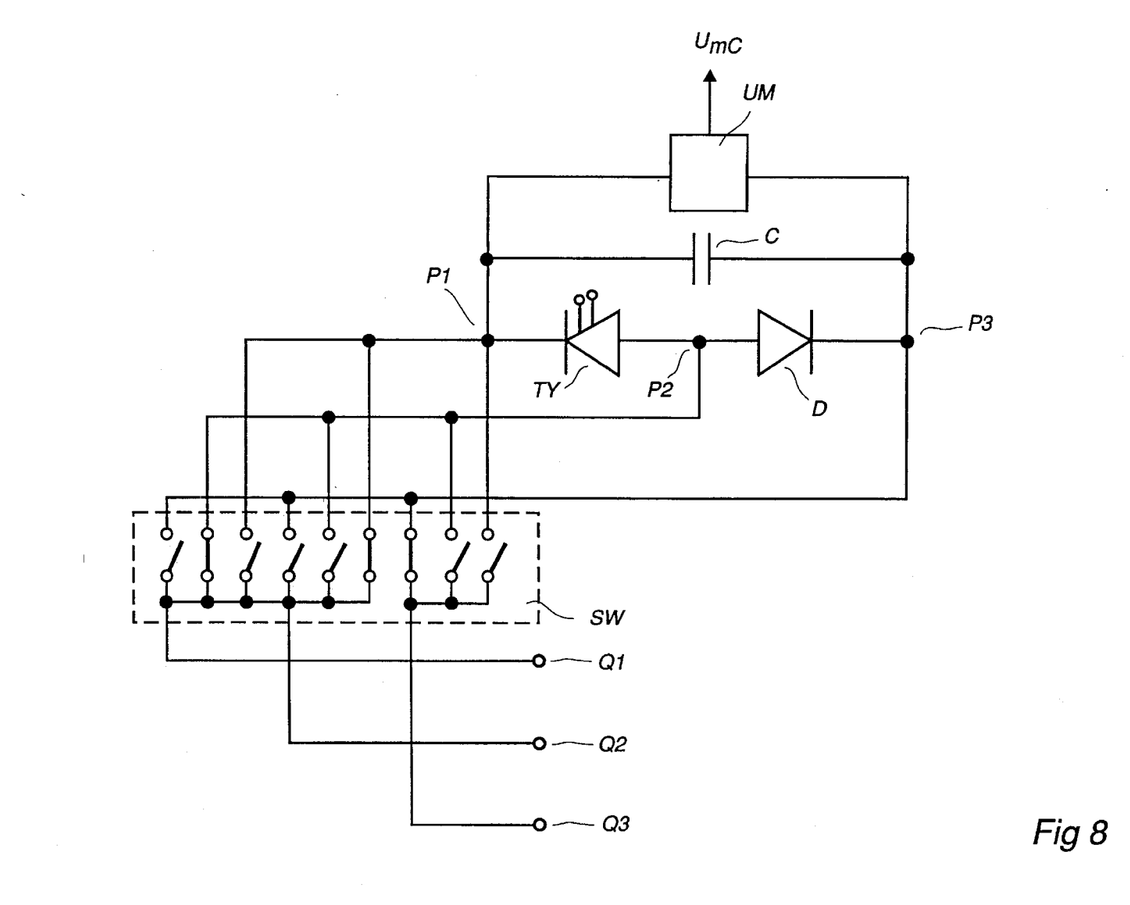
FIG. 8 shows an alternative embodiment of the device according to the invention, wherein the number of semiconductor elements has been reduced by using a number of mechanical disconnecting switches.

FIG. 8 shows an alternative embodiment of a device according to the invention, in which only one turn-off thyristor branch TY, one diode branch D and one capacitor branch C are required. Since the device only has one single capacitor branch, only one single voltage measuring member UM is also required. The three branches mentioned are connected in a triangle. Each one of the three corners P1, P2, P3 of the triangle can be connected with the aid of a set SW of electric switching devices, for example disconnecting switches, to any one of the three terminals Q1, Q2, Q3 of the device. For each combination of connections, the device can be brought to assume the configuration described above with reference to FIGS. 6 and 7 by operation of the electric switching devices. For example, for the case described in FIG. 6 with transfer of a current from Q2 to Q3, P1 is connected to Q2, P2 to Q1 and P3 to Q3. The connection members are shown with these positions in FIG. 8.

The device shown in FIG. 8 can only be used in the event that the current flows into the device through that terminal which is not influenced by the transfer. If desired, the device can be supplemented in a simple manner so as to make it useful for an arbitrary polarity of the current. This can be done, for example, by providing the thyristor branch and the diode branch with mechanical pole changers. Alternatively, the thyristor branch can be connected in anti-parallel with an additional thyristor branch, in which case electric switching devices are arranged in the two branches for connection of that branch which, on each occasion, has the desired conducting direction. The same is done with the diode branch.

Figure 9:
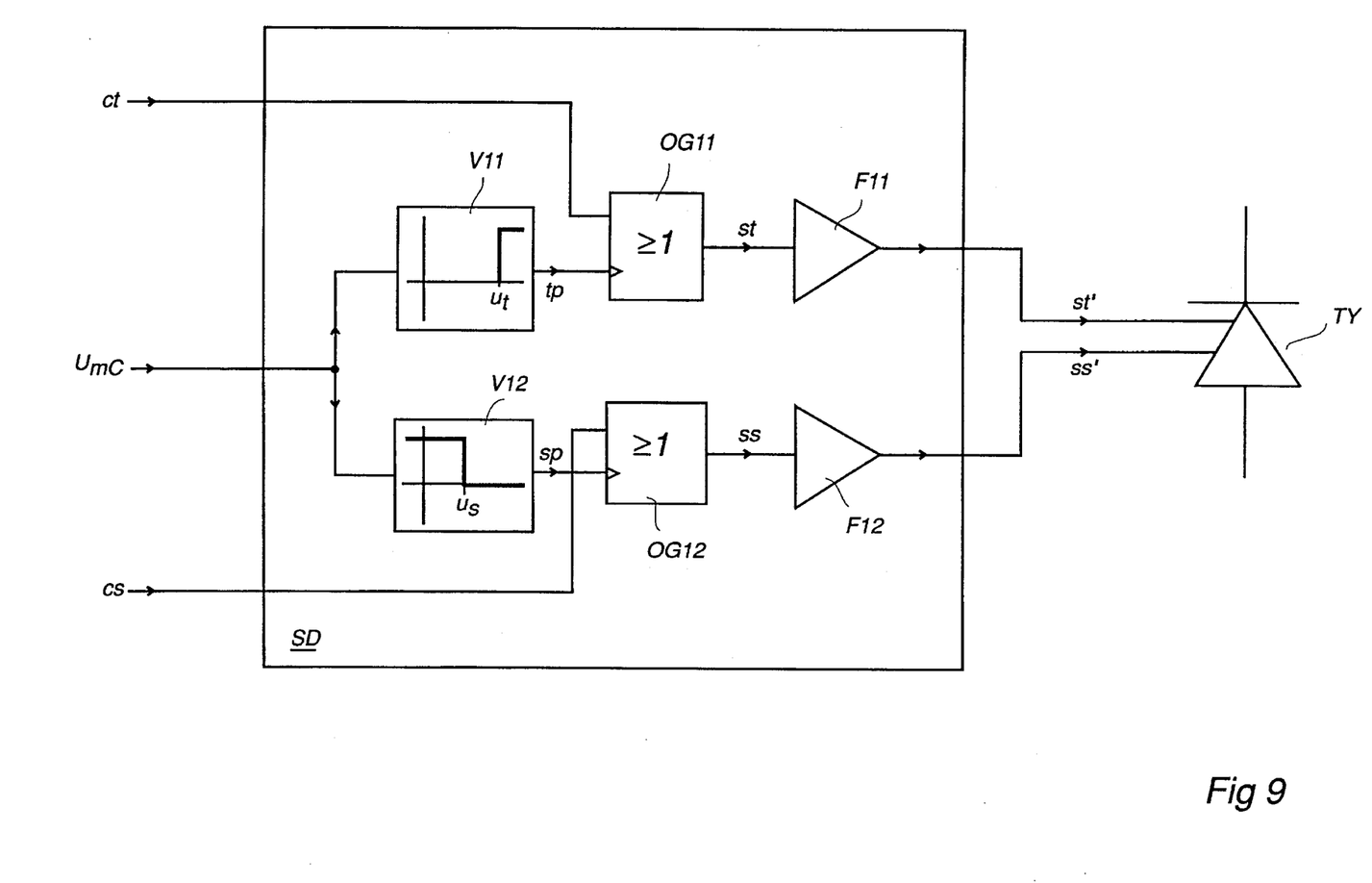
FIG. 9 shows an example of a control device for a device according to the invention.

FIG. 9 schematically shows an example of the configuration of a control device for a device according to the invention, for example the control device SD in FIG. 6. The measurement signal $u_{mC}$ from the measuring member UM is supplied to two level-sensing members V11 and V12, for example so-called level flip-flops. The flip-flop V11 delivers a signal tp when the measurement signal reaches a predetermined reference level $u_r$. The signal is supplied to a differentiating input of an OR circuit OG11. The output signal st of the OR circuit is supplied to an amplifier F11, the output signal st' of which is supplied to the thyristor connection TY in the form of a firing pulse, which results in firing of the thyristor or the thyristors in the thyristor connection. The flip-flop V12 delivers a signal sp when the measurement signal is below a predetermined reference level, $U_s$, which is lower than the reference level $u_r$. The signal from the flip-flop V12 is supplied to a differentiating input of an OR circuit OG12. The output signal ss of the OR circuit is supplied to an amplifier F12. The output signal SS' of the amplifier is supplied to the thyristor connection TY in the form of a turn-off pulse for turning off the thyristor or the thyristors in the connection.

Figure 10A:
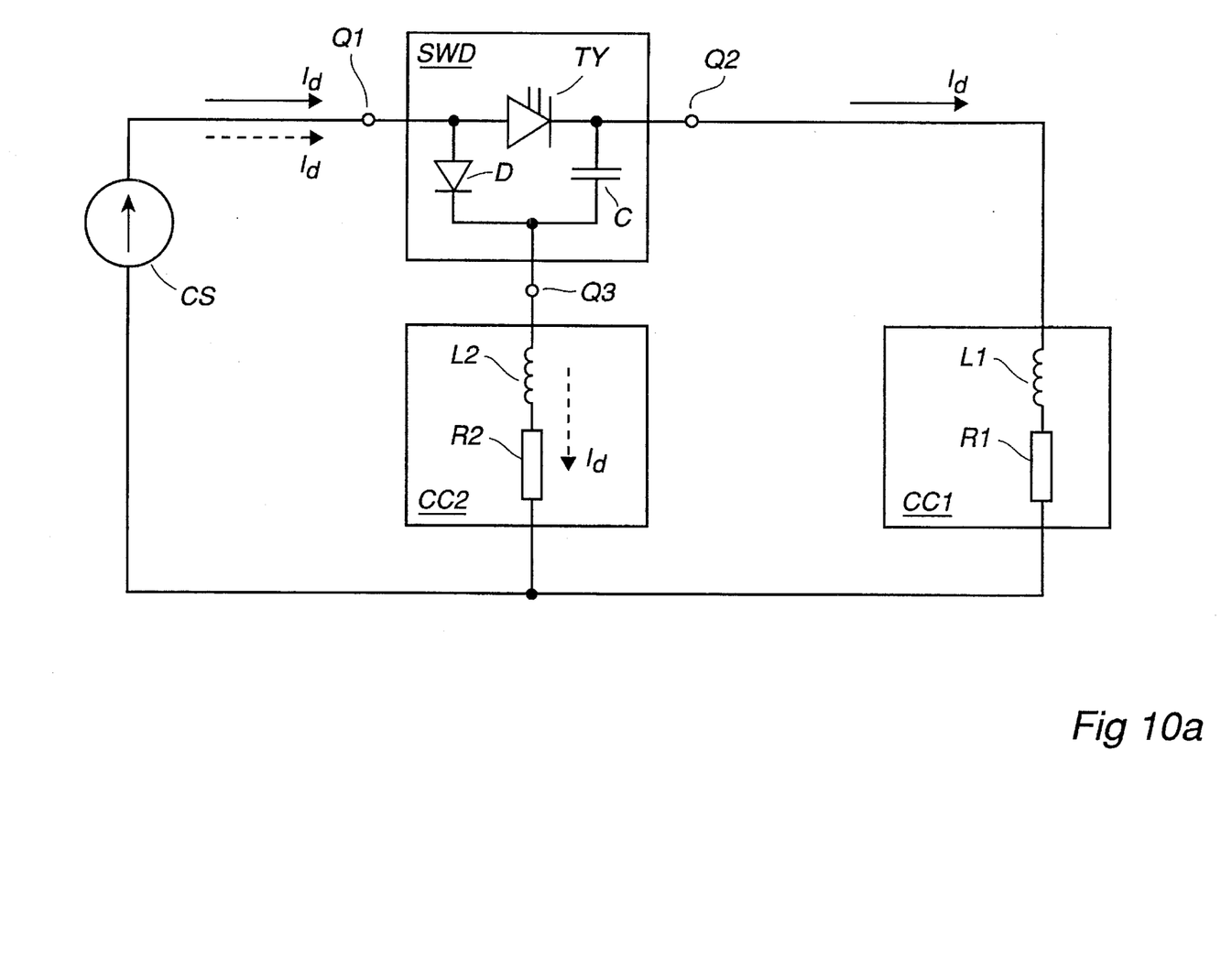
FIG. 10a shows a device SWD according to the invention and connected into a circuit with a current source CS and two, load objects CC1 and CC2.
Figure 10B:
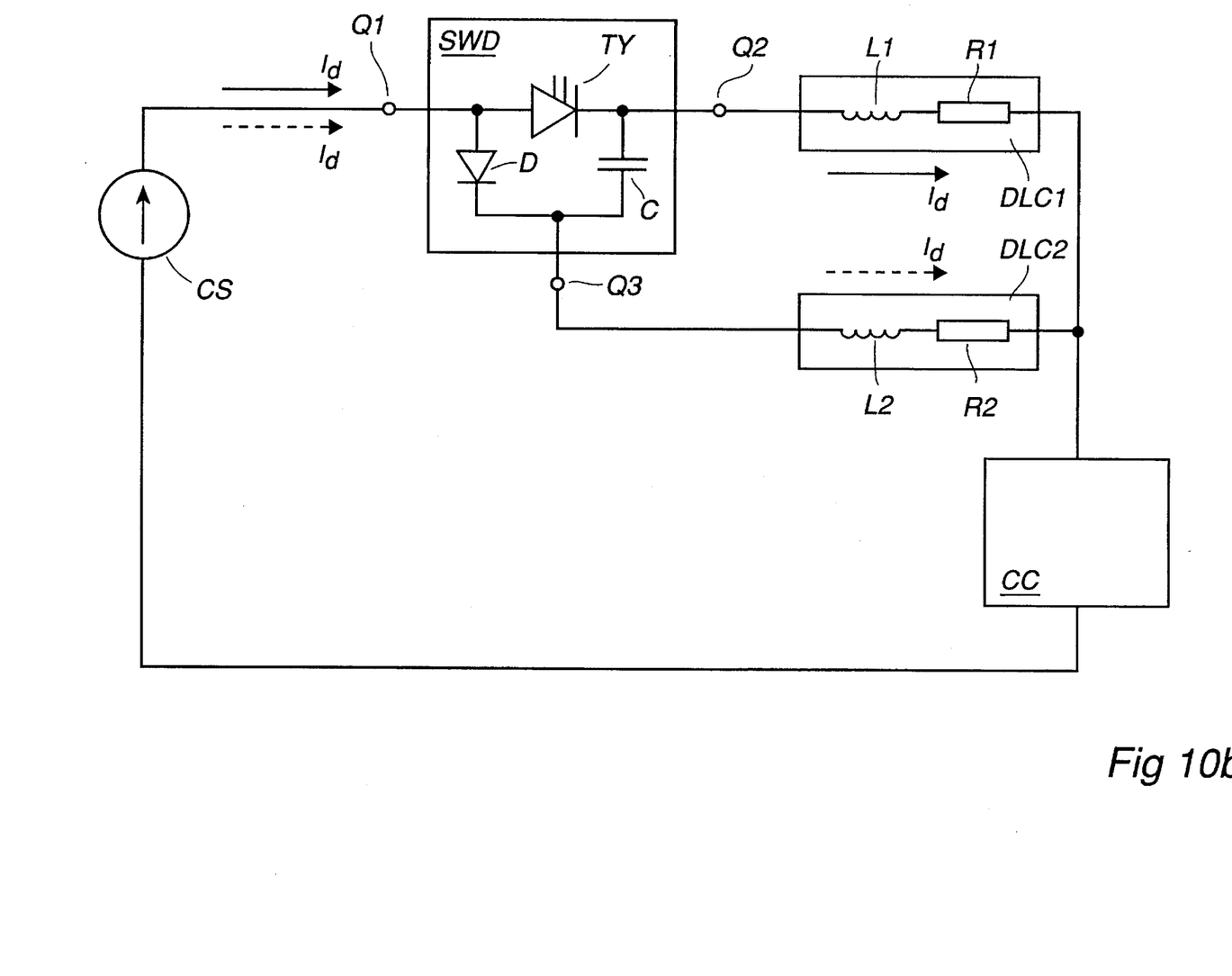
FIG. 10b shows an alternative use of the switching device of the invention.

FIG. 10a shows a device SWD according to the invention connected into a circuit with a current source CS and two load objects CC1 and CC2. The current source CS may be a current source in the real meaning of the word, that is, having a high internal impedance, such as a static rectifier with a d.c. smoothing inductance. Alternatively, it may be any other object or network, with high or low internal impedance, and capable of supplying a direct current. A switching device SWD according to the embodiment shown in FIG. 6 is connected with its terminals Q1 to the current source and with its terminals Q2 and Q3 connected to load circuits CC1 and CC2. In the embodiment shown in FIG. 10a, for the sake of simplicity, the load circuits are shown as being inductive (inductances L1 and L2) and resistive (resistances R1 and R2). Alternatively, the load circuits may have other configurations and consist of other impedance combinations or D.C. networks, or comprise further circuit elements. Each load circuit may, for instance, consist of a load object, such as a static converter or a d.c. motor. Alternatively, a load circuit may consist of a d.c. line, such as the electrode line between an HVDC converter station and its ground electrode, or of a combination of d.c. lines and load objects. As described in connection with FIG. 6, a current $I_d$ initially flowing in the current path through CS and CC1 (unbroken arrows) is switched over to the current path through CS and CC2 by means of the device SWD, and this is a rapid and controlled manner without risk of overvoltages. FIG. 10b shows an alternative use of the switching device of the invention. In this case, the device is used for transfer of a direct load current from a first d.c. line DCL1 to a second d.c. line DCL2, both lines leading to a single load circuit, which may be any arbitrary kind of d.c. load circuit, object or network. The two lines have inductances L1 and L2, respectively, and resistances R1 and R2, respectively. In the same manner as earlier described, the switching device SWD controls the transfer of the d.c. current $I_d$ from the line DCL1 to line DCL2 in a controlled manner.

In an HVDC transmission with a long electrode line, the reference levels $U_s$ and $U_r$, respectively, may be, for example, 65 kV and 80 kV, respectively, and in a transmission with a short electrode line, the reference levels may be of the order of magnitude of 10 kV.

The OR circuit OG11 of the control device is provided with a further input adapted, in those cases where a diode function is to be imparted to the thyristor TY, to be supplied with a continuous signal ct, resulting in the thyristor being supplied with a continuous firing signal st' and being continuously maintained conducting. To ensure that the thyristor is non-conducting in those operating cases where it is to assume this state, the OR circuit OG12 is provided in a corresponding manner with a further input adapted to be supplied, in these operating cases, with a continuous signal cs. This results in a firing signal ss' being supplied to the thyristor and ensures that it changes into, or remains in, the non-conducting state. The embodiment of a device according to the invention described above is only one of many feasible examples. Thus, the invention is described above in an application to a bipolar HVDC transmission, but it can also be applied to a monopolar transmission with the corresponding advantages. Also, within the scope of the invention, the components of the device and the interconnection of these components can be designed in a manner different from that described above.

Instead of the turn-off thyristor connections described above, other suitable connection members may be used, for example controllable semiconductor members of a different type.

The above description shows how the function of the device is controlled by directly sensing the voltage of a capacitor. Alternatively, the capacitor voltage can be sensed in a more indirect manner. For example, in the above-described application of the device for protection of a neutral busbar in an HVDC station against overvoltages, the current through a surge arrester arranged between the neutral busbar and ground can be sensed and used for controlling the turn-off thyristor connection in a manner corresponding to that described above.

To increase the current-handling capacity of the turn-off thyristor connection, two or more thyristors or thyristor branches may possibly be connected in parallel. These can then suitably be adapted to conduct alternatively with a suitable periodicity.

For the purpose of ensuring that the current-handling capacity of a turn-off thyristor connection is not exceeded, a current measuring device may possibly be arranged to measure the current through the thyristor connection. If this current reaches a predetermined upper limit value, a conventional thyristor (or thyristor connection) connected in parallel with the thyristor connection is fired, and/or a normally open mechanical electric switching device, also connected in parallel with the thyristor connection, is closed.

To reduce voltage drops and losses, continuously conducting semiconductor members may, if desired, be bypassed by means of mechanical electric switching devices.

In, for instance, the embodiment described above in connection with FIG. 6, the capacitor branch C is connected directly to those terminals of the two semiconductor connections D and TY, which face away from the branch point Qo, namely the cathode terminals. The first and the second current paths may, of course, within the scope of the invention, alternatively comprise components or elements connected into the current paths, between the semiconductor elements and the connection points of the capacitor branch. Such components or elements may, for instance, be current measuring units or impedances. Also, the capacitor branches of the embodiments described above comprise capacitors only but may, within the scope of the invention, comprise additional components or elements.

I claim:

1. A device in a system for power transmission by means of high voltage direct current, comprising:

a first current path and a second current path, said first and second current paths being interconnected at a branch point;

a first semiconductor connection connected into said first current path only and which is controllable between conducting and non-conducting states and vice versa;

a second semiconductor connection having a diode function and which is connected into said second current path only;

a capacitor branch comprising a capacitor and connected between a first connection point on said first current path and a second connection point on said second current path;

said first connection point and said branch point being located on opposite sides of said first semiconductor connection;

said second connection point and said branch point being located on opposite sides of said second semiconductor connection; and control members for controlling, in dependence on the voltage across the capacitor, said first semiconductor connection between a non-conducting and a conducting state.

2. A device according to claim 1, wherein said control members receive a quantity ($u_{mc}$) corresponding to the capacitor voltage ($u_c$) and controlling said first semiconductor connection to a conducting state if said quantity reaches or exceeds a predetermined upper limit value ($u_r$); and controlling the first semiconductor connection to a non-conducting state if said quantity drops to or becomes lower than a predetermined lower limit value ($u_s$).

3. A device according to claim 1, wherein at least the first semiconductor connection comprises a thyristor.

4. A device according to claim 3, wherein at least said first semiconductor connection comprises a thyristor capable of being turned off by a control signal.

5. A device according to claim 1, wherein said second semiconductor connection comprises a thyristor and said control members supply said thyristor a continuous control signal (st') to achieve a diode function of the thyristor.

6. A device according to claim 1 for transferring a direct current from said first current path to said second current path, wherein said control members maintain, prior to the transfer, said first semiconductor connection continuously conducting; and controlling said transfer by changing said semiconductor connection to a non-conducting state and subsequently, in dependence on the voltage across said capacitor, to control said semiconductor connection between conducting and non-conducting states.

7. A device according to claim 1, wherein said capacitor is connected between a point in the second current path and a point with a given potential, the first semiconductor connection is between said point with a given potential and said branch point; said second semiconductor is between said branch point and said point in said second current path; and said control members turn ON said first semiconductor connection if the voltage difference between said point in said second current path and said point with a given potential exceeds a predetermined limit value so that said voltage between said point in the second current path and said point with a given potential is limited.

8. A device according to claim 1, comprising three terminals and three semiconductor branches connected in a star connection between said three terminals and a common point, each semiconductor branch being controllable between conducting and non-conducting states and vice versa.

9. A device according to claim 1, comprising three terminals and three semiconductor branches connected in a delta connection between said three terminals, each semiconductor branch being controllable between conducting and non-conducting states and vice versa.

10. A device according to claim 6, wherein each semiconductor branch is controllable to a conducting state in both current directions.

11. A device according to claim 7, wherein each semiconductor branch is controllable to a conducting state in both current directions.

12. A device according to claim 1, in a converter station in a plant for bipolar power transmission by means of high-voltage direct current for containing said device, and comprising a neutral busbar, a converter connected between the neutral busbar and a pole line, and a station ground connectible to said neutral busbar, and wherein said first semiconductor connection is connected between said station ground and a first point on said neutral busbar, said capacitor is connected between station ground and a second point on said neutral busbar, and said second semiconductor connection is connected between said first and second points on said neutral busbar.

13. A device according to claim 12 in a converter station in a plant for bipolar power transmission comprising an electrode line connected to a neutral point on said neutral busbar, said electrode line being connected to a ground electrode spaced from the station, a first converter connected between said neutral busbar and a first pole line, a second converter connected between said neutral busbar and a second pole line, said neutral busbar including a first part located between the neutral point and said first converter and a second part located between the second converter and said neutral point, a capacitor and a first semiconductor connection are connected between said station ground and the first part of said neutral busbar and another capacitor and a second semiconductor device are connected between station ground and the second part of said neutral busbar.

14. A device according to claim 1 in a converter station in a plant for bipolar power transmission and comprising a neutral busbar, an electrode line connectible to a neutral point on said neutral busbar, a first converter connected between said neutral busbar and a first pole line a second converter connected between the neutral busbar and a second pole line, said neutral busbar includes a first part located between said neutral point and said first converter and a second part located between said second converter and said neutral point, and wherein each one of said two parts of said neutral busbar includes series-connected semiconductor members controllable between conducting and non-conducting states and vice versa, a series connection of a capacitor and a bidirectionally controllable semiconductor member, said series connection being connected in parallel with said series-connected semiconductor members, and control members for controlling at least one of said series-connected semiconductor members and bidirectionally controllable semiconductor members in dependence upon the capacitor voltage.

15. A device according to claim 14, further comprising connection members for connection of a connection point of the series-connected semiconductor members in one part of said neutral busbar to the corresponding point in the other part of said neutral busbar.

16. A device according to claim 14, wherein at least certain of said series-connected semiconductor members and bidirectionally controllable semiconductor members are thyristors.

17. A device according to claim 16, wherein at least certain of said thyristors consist of thyristors which are capable of being turned OFF by a control signal.

18. A device according to claim 16, further comprising control members for supplying at least some of said thyristors with a continuous control signal to obtain a diode function of said thyristors.

19. A device according to claim 17, further comprising control members for supplying at least some of said thyristors with a continuous control signal to obtain a diode function of said thyristors.

20. A device according to claim 14, further comprising connection members for connection of said second pole line to the connection point between the capacitor and the bidirectionally controllable semiconductor member which are associated with said first part of said neutral bus bar.

21. A device according to claim 15, further comprising connection members for connection of said second pole line to the connection point between the capacitor and the bidirectionally controllable semiconductor member which are associated with said first part of said neutral bus bar.

22. A device according to claim 14, further comprising connection members for connection of said first pole line to the connection point between the capacitor and the bidirectionally controllable semiconductor member which are associated with said second part of said neutral bus bar.

23. A device according to claim 15, further comprising connection members for connection of said first pole line to the connection point between the capacitor and the bidirectionally controllable semiconductor member which are associated with said second part of said neutral bus bar.

24. A device according to claim 1, further comprising three terminals and switching members for switchable connection of said first and second connection points and said branch point to said terminals.

* * * * *